United States Patent
Fukushima

(10) Patent No.: US 10,429,207 B2
(45) Date of Patent: Oct. 1, 2019

(54) PITCH ANGULAR VELOCITY CORRECTION VALUE CALCULATION DEVICE, ATTITUDE ANGLE CALCULATION DEVICE, AND METHOD FOR CALCULATING PITCH ANGULAR VELOCITY CORRECTION VALUE

(71) Applicant: JVC KENWOOD Corporation, Yokohama-shi, Kanagawa (JP)

(72) Inventor: Hidenori Fukushima, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 74 days.

(21) Appl. No.: 15/350,195

(22) Filed: Nov. 14, 2016

(65) Prior Publication Data
US 2017/0160100 A1 Jun. 8, 2017

(30) Foreign Application Priority Data
Dec. 2, 2015 (JP) ................. 2015-235916

(51) Int. Cl.
- G01C 25/00 (2006.01)
- G01C 19/00 (2013.01)
- G01C 21/16 (2006.01)

(52) U.S. Cl.
CPC ............ *G01C 25/00* (2013.01); *G01C 19/00* (2013.01); *G01C 21/165* (2013.01)

(58) Field of Classification Search
CPC ....................................................... G01C 25/00
See application file for complete search history.

(56) References Cited

U.S. PATENT DOCUMENTS

| | | | |
|---|---|---|---|
| 2007/0156316 A1* | 7/2007 | Ono | B60W 40/11 701/38 |
| 2009/0150075 A1* | 6/2009 | Watanabe | G01C 21/005 701/472 |
| 2009/0177425 A1* | 7/2009 | Sugihara | G01P 21/00 702/85 |
| 2010/0030471 A1* | 2/2010 | Watanabe | G01C 21/12 701/494 |
| 2010/0292915 A1* | 11/2010 | Ishigami | G01C 21/26 701/532 |
| 2011/0065473 A1* | 3/2011 | Kimishima | G01C 21/16 455/556.1 |
| 2013/0238277 A1* | 9/2013 | Sasakura | G01C 19/5776 702/141 |

FOREIGN PATENT DOCUMENTS

JP 2011-191243 9/2011

\* cited by examiner

*Primary Examiner* — Manuel L Barbee
*Assistant Examiner* — Raymond L Nimox
(74) *Attorney, Agent, or Firm* — Amin, Turocy & Watson LLP

(57) ABSTRACT

A pitch angular velocity correction value calculation device includes a pitch angle calculation unit and a correction value calculation unit. The pitch angle calculation unit calculates a pitch angle among attitude angles of a vehicle on the basis of a pitch angular velocity that is an angular velocity of the vehicle detected by a triaxial gyro sensor, and a correction value of the pitch angular velocity.

1 Claim, 3 Drawing Sheets

PITCH ANGULAR VELOCITY CORRECTION VALUE CALCULATION DEVICE, ATTITUDE ANGLE CALCULATION DEVICE, AND METHOD FOR CALCULATING PITCH ANGULAR VELOCITY CORRECTION VALUE

CROSS-REFERENCE TO RELATED APPLICATION(S)

The present application claims priority to and incorporates by reference the entire contents of Japanese Patent Application No. 2015-235916 filed in Japan on Dec. 2, 2015.

BACKGROUND OF THE INVENTION

1. Field of the Invention

The present invention relates to a pitch angular velocity correction value calculation device, an attitude angle calculation device, and a method for calculating a pitch angular velocity correction value.

2. Description of the Related Art

Objects such as vehicles are each equipped with a rate gyro for calculating attitude angles of the object. The rate gyro generates offset voltage (hereinafter referred to as "offset") depending on a change in temperature or humidity, for example. An offset correction device for onboard gyros has been known, which accurately corrects the offset of a rate gyro (for example, refer to Japanese Patent Application Laid-open No. 2011-191243 A). This technique determines a mean value of a prescribed period of angular velocity, during a period in which an angular velocity determined by a yaw rate gyro is below a prescribed angular velocity, from among angular velocities determined by a pitch rate gyro, and performs correction by using the mean value as an offset of the pitch rate gyro.

The technique described in Japanese Patent Application Laid-open No. 2011-191243 A calculates an offset using the angular velocity of a pitch rate during a period in which the pitch rate is not affected by a yaw rate, and corrects the offset of the pitch rate gyro. However, when a vehicle travels on a slope for example, a component from vertical movement of the vehicle is superimposed on the pitch rate gyro. Thus, the technique described in Japanese Patent Application Laid-open No. 2011-191243 A has room for improvement in the accuracy of the offset correction of a pitch rate gyro.

SUMMARY OF THE INVENTION

It is an object of the present invention to at least partially solve the problems in the conventional technology.

A pitch angular velocity correction value calculation device according to a present invention includes a pitch angle calculation unit configured to calculate a pitch angle among attitude angles of an object based on a pitch angular velocity that is an angular velocity of the object detected by an angular velocity detection unit and a correction value of the pitch angular velocity, and a correction value calculation unit configured to modify the correction value based on the pitch angle calculated by the pitch angle calculation unit using the correction value of the pitch angular velocity, and a corresponding tilt angle of the object calculated by a tilt angle calculation unit based on a speed of the object detected by a speed detection unit and acceleration of the object detected by an acceleration detection unit, and the pitch angle calculated in a past by the pitch angle calculation unit using the correction value, and the corresponding tilt angle calculated by the tilt angle calculation unit.

An attitude angle calculation device according to the present invention includes the pitch angular velocity correction value calculation device described above, and a corrected pitch angle calculation unit configured to cause the pitch angle calculation unit to correct and calculate the pitch angle based on a yaw angular velocity and a roll angular velocity further detected by the angular velocity detection unit, the pitch angular velocity detected by the angular velocity detection unit, and the correction value calculated by the correction value calculation unit.

A method for calculating a pitch angular velocity correction value according to a present invention includes calculating a pitch angle among attitude angles of an object based on a pitch angular velocity that is an angular velocity of the object detected at detecting an angular velocity and a correction value of the pitch angular velocity, and calculating a correction value by modifying the correction value based on the pitch angle calculated at the calculating the pitch angle using the correction value of the pitch angular velocity, and a corresponding tilt angle of the object calculated at calculating a tilt angle based on a speed of the object detected at detecting a speed and acceleration of the object detected at detecting acceleration, and the pitch angle calculated in a past at the calculating the pitch angle using the correction value, and the corresponding tilt angle calculated at the calculating the tilt angle.

DETAILED DESCRIPTION OF THE PREFERRED EMBODIMENTS

The following describes an embodiment of a pitch angular velocity correction value calculation device, an attitude angle calculation device, and a method for calculating a pitch angular velocity correction value according to the present invention in detail with reference to the accompanying drawings. The following embodiment is not intended to limit the present invention.

Figure 1:
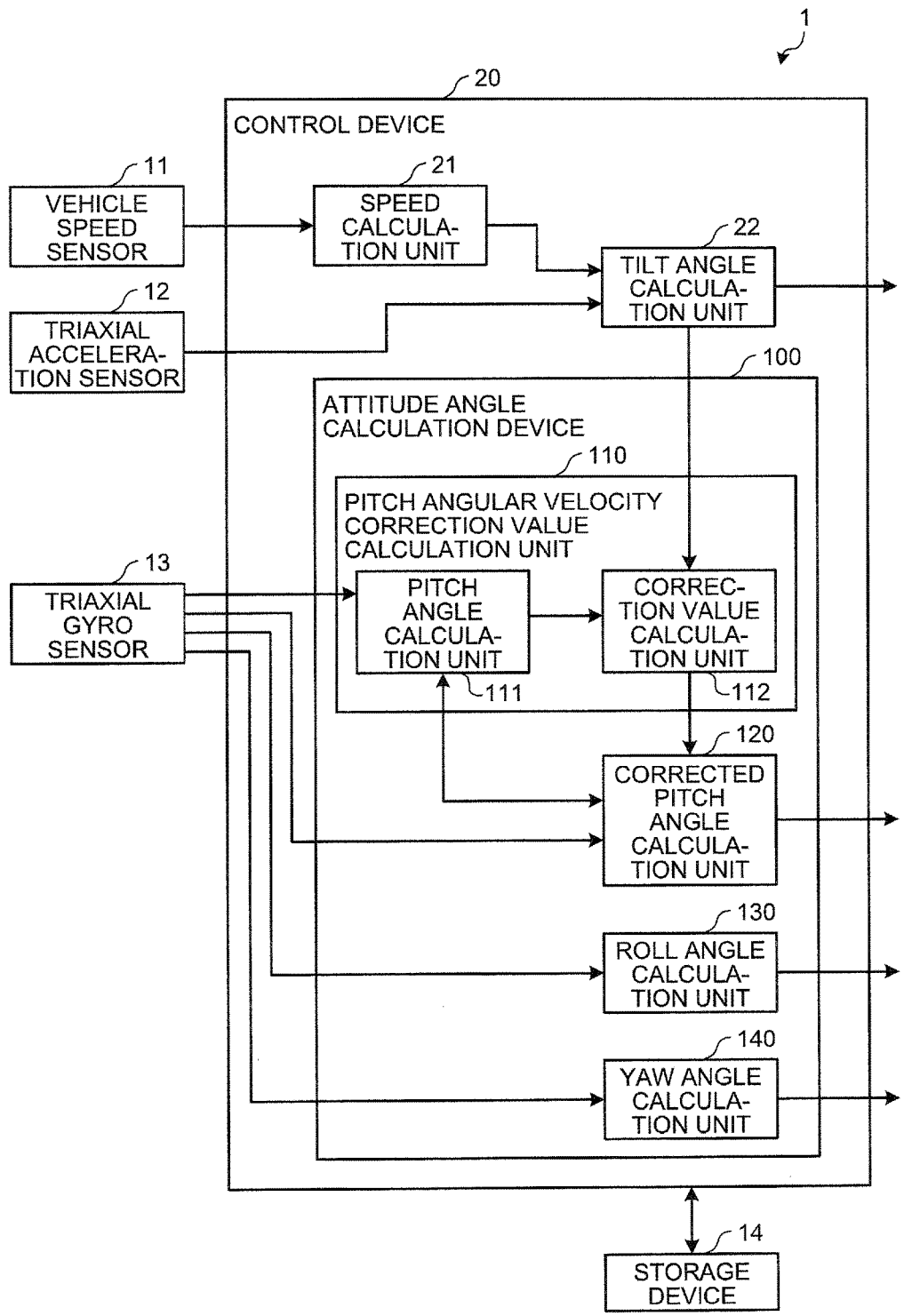
FIG. 1 illustrates an exemplary configuration of an attitude angle calculation device including a pitch angular velocity correction value calculation unit according to an embodiment.

FIG. 1 illustrates an exemplary configuration of an attitude angle calculation device including a pitch angular velocity correction value calculation unit (pitch angular velocity correction value calculation device) according to an embodiment. An attitude angle calculation device 100 is disposed in an object. The present embodiment describes a vehicle as an example of the object. The attitude angle calculation device 100 corrects and calculates attitude angles of the vehicle on the basis of an angular velocity of the vehicle. The attitude angle calculation device 100 includes a pitch angular velocity correction value calculation unit 110 that calculates a correction value of a pitch angular velocity, a corrected pitch angle calculation unit 120 that corrects and calculates a pitch angle on the basis of the calculated correction value of the pitch angular velocity, and a roll angle calculation unit 130 that calculates a roll angle, and a yaw angle calculation unit 140 that calculates a yaw angle.

First, the following describes the vehicle in which the attitude angle calculation device 100 is disposed. The present embodiment describes a case in which the attitude angle calculation device 100 is disposed in a vehicle; however, a subject in which the attitude angle calculation device 100 is disposed is not limited to a vehicle and the attitude angle calculation device 100 can be disposed in various devices. In the vehicle, a detection unit 1 is disposed as illustrated in FIG. 1. The detection unit 1 detects, for example, a speed of the vehicle, acceleration of the vehicle, an angular velocity of the vehicle, a tilt angle of the vehicle, and an attitude angle of the vehicle. The detection unit 1 includes a control device 20 that implements, as one function, a vehicle speed sensor (speed detection unit) 11, a triaxial acceleration sensor (acceleration detection unit) 12, a triaxial gyro sensor (angular velocity detection unit) 13, a storage device 14, and the attitude angle calculation device 100, which are disposed at respective positions in the vehicle.

The vehicle speed sensor 11 detects a speed of the vehicle. The vehicle speed sensor 11 is disposed on a drive shaft or a tire of the vehicle. The vehicle speed sensor 11 detects a pulse signal corresponding to the rotation of the drive shaft or the tire. The vehicle speed sensor 11 outputs the detected pulse signal as a speed pulse signal to a speed calculation unit 21 of the control device 20.

The triaxial acceleration sensor 12 detects acceleration of the vehicle. Specifically, the triaxial acceleration sensor 12 detects acceleration generated in the longitudinal direction of the vehicle, acceleration generated in the lateral direction of the vehicle, and acceleration generated in the vertical direction of the vehicle. The triaxial acceleration sensor 12 outputs the detected accelerations of the vehicle as acceleration output signals to a tilt angle calculation unit 22 of the control device 20.

The triaxial gyro sensor 13 detects an angular velocity of the vehicle. Specifically, the triaxial gyro sensor 13 includes a roll rate gyro, a pitch rate gyro, and a yaw rate gyro. The roll rate gyro detects a roll angular velocity that is an angular velocity of the rotation on an axis in the longitudinal direction of the vehicle. The pitch rate gyro detects a pitch angular velocity that is an angular velocity of the rotation on an axis in the lateral direction of the vehicle. The yaw rate gyro detects a yaw angular velocity that is an angular velocity of the rotation on an axis in the vertical direction of the vehicle. The triaxial gyro sensor 13 outputs, as angular velocity signals, the roll angular velocity detected by the roll rate gyro, the pitch angular velocity detected by the pitch rate gyro, and the yaw angular velocity detected by the yaw rate gyro to the attitude angle calculation device 100 of the control device 20.

The storage device 14 stores therein data used for various processing performed by the control device 20 and the results of the various processing. Examples of the storage device 14 include semiconductor memory devices such as a random access memory (RAM), a read only memory (ROM), and a flash memory, or storage devices such as a hard disk and an optical disc. The storage device 14 stores therein, for example, an offset correction value (hereinafter referred to as "correction value") of a pitch angular velocity, the correction value being calculated by the correction value calculation unit 112 of the pitch angular velocity correction value calculation unit 110. The storage device 14 stores therein, for example, the corresponding tilt angle of the vehicle calculated by the tilt angle calculation unit 22 when the correction value of the pitch angular velocity is calculated.

An example of the control device 20 includes an arithmetic processing unit including a central processing unit (CPU), for example. The control device 20 loads a computer program stored in the storage device 14 to a memory and executes an instruction contained in the computer program. The control device 20 includes the speed calculation unit 21, the tilt angle calculation unit 22, and the attitude angle calculation device 100 including the pitch angular velocity correction value calculation unit 110, the corrected pitch angle calculation unit 120, the roll angle calculation unit 130, and the yaw angle calculation unit 140.

The speed calculation unit 21 calculates a speed of the vehicle on the basis of a speed pulse signal. Specifically, the speed calculation unit 21 multiplies a speed pulse signal output from the vehicle speed sensor 11 by a conversion factor (unit: m/pulse) used for conversion into a distance and calculates the speed. The speed calculation unit 21 outputs the calculated speed of the vehicle to the tilt angle calculation unit 22.

The tilt angle calculation unit 22 calculates a tilt angle α of the vehicle on the basis of the speed calculated by the speed calculation unit 21 and the acceleration detected by the triaxial acceleration sensor 12.

Figure 2:
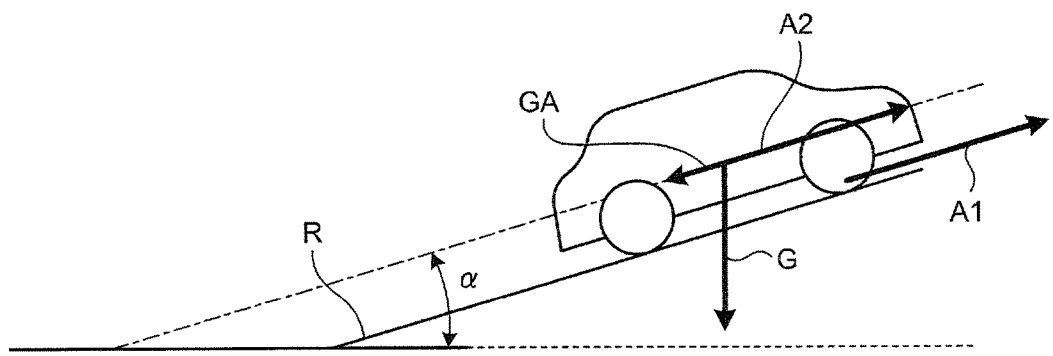
FIG. 2 illustrates a tilt angle of a vehicle equipped with the attitude angle calculation device including the pitch angular velocity correction value calculation unit.

With reference to FIG. 2, the following describes a method for calculating the tilt angle α in the tilt angle calculation unit 22. FIG. 2 illustrates a tilt angle of a vehicle equipped with the attitude angle calculation device including the pitch angular velocity correction value calculation unit. In FIG. 2, the vehicle travels on an inclined road surface R. The tilt angle α is the tilt angle of the vehicle with respect to the horizontal plane. Here, a diagonal component GA of gravitational acceleration G is applied to the vehicle. The tilt angle calculation unit 22 differentiates the speed calculated by the speed calculation unit 21 to obtain the acceleration, i.e., a first acceleration A1, and the triaxial acceleration sensor 12 detects the acceleration, i.e., a second acceleration A2. The second acceleration A2 is represented by a vector sum of the first acceleration A1 and the diagonal component GA of the gravitational acceleration G. The magnitude of the vector GA is represented by the difference between the absolute values of the vector A1 and the vector A2. From the above components, the tilt angle α is represented as follows.

$$\alpha = \sin^{-1}\frac{|GA|}{|G|} = \sin^{-1}\frac{|A2|-|A1|}{|G|} \quad (1)$$

The tilt angle calculation unit 22 outputs the calculated tilt angle α to the correction value calculation unit 112 of the pitch angular velocity correction value calculation unit 110 and an external device.

Referring back to FIG. 1, the attitude angle calculation device 100 includes the pitch angular velocity correction value calculation unit 110, the corrected pitch angle calculation unit 120, the roll angle calculation unit 130 and the yaw angle calculation unit 140. The attitude angle calculation device 100 calculates a correction value of a pitch angular velocity by the pitch angular velocity correction value calculation unit 110, and corrects and calculates a pitch angle by the corrected pitch angle calculation unit 120 on the basis of the calculated correction value. The attitude angle calculation device 100 calculates a roll angle by the roll angle calculation unit 130, and calculates a yaw angle by the yaw angle calculation unit 140.

The pitch angular velocity correction value calculation unit 110 calculates a correction value of a pitch angular velocity detected by the triaxial gyro sensor 13. The correction value of the pitch angular velocity is used for correcting an offset of the pitch rate gyro. The pitch angular velocity correction value calculation unit 110 includes a pitch angle calculation unit 111 that calculates at least a pitch angle among attitude angles of the vehicle, and a correction value calculation unit 112 that calculates a correction value of a pitch angular velocity.

The pitch angle calculation unit 111 calculates at least a pitch angle among the attitude angles of the vehicle on the basis of a yaw angular velocity, a pitch angular velocity, and a roll angular velocity detected by the triaxial gyro sensor 13, and the correction value of the pitch angular velocity. In the present embodiment, the pitch angle calculation unit 111 calculates a pitch angle.

Figure 3:
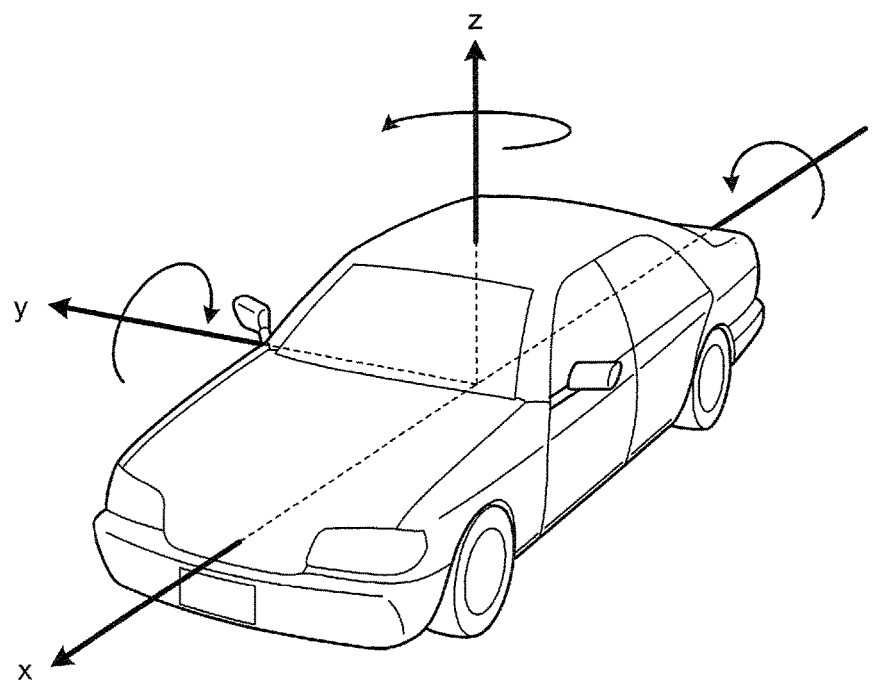
FIG. 3 illustrates attitude angles of the vehicle equipped with the attitude angle calculation device including the pitch angular velocity correction value calculation unit.

With reference to FIG. 3, the following describes a method for calculating attitude angles in the pitch angle calculation unit 111. FIG. 3 illustrates attitude angles of the vehicle equipped with the attitude angle calculation device including the pitch angular velocity correction value calculation unit. In the present embodiment, the attitude angles, which are object coordinates when the z axis, the y axis, and the x axis of inertia coordinates are subjected to $\psi$, $\theta$, and $\phi$ rotations, respectively, are defined as Euler angles ($\phi$, $\theta$, $\psi$). The rotation angles about the x axis, the y axis, and the z axis are a roll angle $\phi$, a pitch angle $\theta$, and a yaw angle $\psi$, respectively.

A direction cosine matrix E from an inertia coordinate system to an object coordinate system is represented as follows using the Euler angles ($\phi$, $\theta$, $\psi$).

$$E = \begin{bmatrix} 1 & 0 & 0 \\ 0 & \cos\phi & \sin\phi \\ 0 & -\sin\phi & \cos\phi \end{bmatrix} \begin{bmatrix} \cos\theta & 0 & -\sin\theta \\ 0 & 1 & 0 \\ \sin\theta & 0 & \cos\theta \end{bmatrix} \begin{bmatrix} \cos\phi & \sin\phi & 0 \\ -\sin\phi & \cos\phi & 0 \\ 0 & 0 & 1 \end{bmatrix} \quad (2)$$

$$= \begin{bmatrix} \cos\theta\cos\phi & \cos\theta\sin\phi & -\sin\theta \\ \sin\phi\sin\theta\cos\phi - \cos\phi\sin\phi & \sin\phi\sin\theta\sin\phi + \cos\phi\cos\phi & \sin\phi\cos\theta \\ \cos\phi\sin\theta\cos\phi + \sin\phi\sin\phi & \cos\phi\sin\theta\sin\phi - \sin\phi\cos\phi & \cos\phi\cos\theta \end{bmatrix}$$

Here, quaternions q1, q2, q3, and q4 are represented as follows using unit vectors n in rotation directions and a rotation angle $\theta$.

$q_1 = n_1 \sin\theta/2$ $q_2 = n_2 \sin\theta/2$ $q_3 = n_3 \sin\theta/2$ $q_4 = \cos\theta/2$ $q_1^2 + q_2^2 + q_3^2 + q_4^2 = |q^2| + q_4^2 = 1$ \quad (3)

With Expression 2 and Expression 3, the direction cosine matrix E is represented as follows using the quaternions q1, q2, q3, and q4.

$$E = \begin{bmatrix} q_1^2 - q_2^2 - q_3^2 + q_4^2 & 2(q_1 q_2 + q_3 q_4) & 2(q_1 q_3 - q_2 q_4) \\ 2(q_1 q_2 - q_3 q_4) & -q_1^2 + q_2^2 - q_3^2 + q_4^2 & 2(q_2 q_3 + q_1 q_4) \\ 2(q_1 q_3 + q_2 q_4) & 2(q_2 q_3 - q_1 q_4) & -q_1^2 - q_2^2 + q_3^2 + q_4^2 \end{bmatrix} \quad (4)$$

Next, the following describes the relation between the direction cosine matrix E and the angular velocity $\omega$. A time differential of the direction cosine matrix E is represented as follows.

$$\dot{E} = \begin{bmatrix} \dot{E}_{11} & \dot{E}_{12} & \dot{E}_{13} \\ \dot{E}_{21} & \dot{E}_{22} & \dot{E}_{23} \\ \dot{E}_{31} & \dot{E}_{32} & \dot{E}_{33} \end{bmatrix} \quad (5)$$

Here, the angular velocity $\omega$ and the direction cosine matrix E are represented as follows.

$\tilde{\omega} = E\dot{E}^T$ $\tilde{\omega}$: A skew-symmetric matrix generated from $\omega$ \quad (6)

A skew-symmetric matrix generated from the angular velocity $\omega$ is represented as follows.

$$\tilde{\omega} = \begin{bmatrix} 0 & -\omega_3 & \omega_2 \\ \omega_3 & 0 & -\omega_1 \\ -\omega_2 & \omega_1 & 0 \end{bmatrix} \quad (7)$$

With Expression 6 and Expression 7, the time differential of the direction cosine matrix E is represented as follows using the angular velocity $\omega$.

$$\dot{E} = -\tilde{\omega}E \quad (8)$$

$$= \begin{bmatrix} E_{21}\omega_3 - E_{31}\omega_2 & E_{22}\omega_3 - E_{32}\omega_2 & E_{23}\omega_3 - E_{33}\omega_2 \\ E_{31}\omega_1 - E_{11}\omega_3 & E_{32}\omega_1 - E_{12}\omega_3 & E_{33}\omega_1 - E_{13}\omega_3 \\ E_{11}\omega_2 - E_{21}\omega_1 & E_{12}\omega_2 - E_{22}\omega_1 & E_{13}\omega_2 - E_{23}\omega_1 \end{bmatrix}$$

With Expression 4 and Expression 8, the following relations of the angular velocities $\omega_1$ to $\psi_3$ are established.

$\omega_1 = 2(\dot{q}_1 q_4 + \dot{q}_2 q_3 - \dot{q}_3 q_2 - \dot{q}_4 q_1)$ $\omega_2 = 2(\dot{q}_2 q_4 + \dot{q}_3 q_1 - \dot{q}_1 q_3 - \dot{q}_4 q_2)$ $\omega_3 = 2(\dot{q}_3 q_4 + \dot{q}_1 q_3 - \dot{q}_2 q_1 - \dot{q}_4 q_3)$ \quad (9)

With Expression 9, the angular velocity $\omega$ is represented as follows in a form of matrix.

$$\omega = 2\begin{bmatrix} q_4 & q_3 & -q_2 & -q_1 \\ -q_3 & q_4 & q_1 & -q_2 \\ q_2 & -q_1 & q_4 & -q_3 \end{bmatrix} \begin{bmatrix} \dot{q}_1 \\ \dot{q}_2 \\ \dot{q}_3 \\ \dot{q}_4 \end{bmatrix} \quad (10)$$

With Expression 9, the angular velocity $\omega$ is represented as follows in a form of vector.

$\omega = 2(q_4 \overset{\circ}{q} - \dot{q}_4 q - q \times \overset{\circ}{q})$ $\overset{\circ}{q}$: A time differential of $q$ in an object coordinate system \quad (11)

Next, the differential equations of the quaternions q1, q2, q3, and q4 are represented as follows.

$$\overset{\circ}{q} = \frac{1}{2}(q_4\omega + q \times \omega) \qquad (12)$$

$$\dot{q}_4 = -\frac{1}{2}\omega q$$

$$\frac{d}{dt}\begin{bmatrix} q_1 \\ q_2 \\ q_3 \\ q_4 \end{bmatrix} = \frac{1}{2}\begin{bmatrix} 0 & \omega_3 & -\omega_2 & \omega_1 \\ -\omega_3 & 0 & \omega_1 & \omega_2 \\ \omega_2 & -\omega_1 & 0 & \omega_3 \\ -\omega_1 & -\omega_2 & -\omega_3 & 0 \end{bmatrix}\begin{bmatrix} q_1 \\ q_2 \\ q_3 \\ q_4 \end{bmatrix}$$

For the differential equations of Expression 12 obtained as described above, the pitch angle calculation unit 111 obtains solutions by the Runge-Kutta method using a yaw angular velocity, a pitch angular velocity, and a roll angular velocity detected by the triaxial gyro sensor 13. At this time, the pitch angle calculation unit 111 uses, for the pitch angular velocity, a value obtained by offsetting the pitch angular velocity detected by the triaxial gyro sensor 13 with the correction value of the pitch angular velocity. In this manner, the pitch angle calculation unit 111 solves the differential equations to calculate a pitch angle. The pitch angle calculation unit 111 outputs the calculated pitch angle to the correction value calculation unit 112.

The correction value calculation unit 112 calculates a correction value of a pitch angular velocity on the basis of the pitch angle calculated by the pitch angle calculation unit 111 and the corresponding tilt angle, and a previously calculated pitch angle and the corresponding tilt angle. Specifically, the correction value calculation unit 112 modifies a correction value of a pitch angular velocity on the basis of: the pitch angle calculated by the pitch angle calculation unit 111 using the correction value (the current correction value) of the pitch angular velocity, and the current tilt angle of the vehicle calculated by the tilt angle calculation unit 22 on the basis of a speed of the vehicle calculated by the speed calculation unit 21 and acceleration of the vehicle detected by the triaxial acceleration sensor 12; and the pitch angle calculated by the pitch angle calculation unit 111 using the same correction value of the pitch angular velocity having being calculated in the past and stored in the storage device 14, and the tilt angle calculated by the tilt angle calculation unit 22 when the previous correction value of the pitch angular velocity was calculated. In other words, with respect to the difference between the pitch angle calculated by the pitch angle calculation unit 111 and the corresponding tilt angle α calculated by the tilt angle calculation unit 22, the correction value calculation unit 112 compares the current difference value with a difference value (past difference value) obtained when the same correction value of the pitch angular velocity was used in the calculation, and modifies the correction value of the pitch angular velocity on the basis of the amount of difference resulting from the comparison. Specifically, for example, with respect to the difference between the pitch angle calculated by the pitch angle calculation unit 111 and the corresponding tilt angle α calculated by the tilt angle calculation unit 22, the correction value calculation unit 112 may modify the correction value of the pitch angular velocity so that the amount of difference between the current difference value and the past difference value is zero. The correction value calculation unit 112 outputs, to the corrected pitch angle calculation unit 120, the modified correction value of the pitch angular velocity having been calculated, as a correction value of the pitch angular velocity. The correction value calculation unit 112 stores, in the storage device 14, the modified correction value of the pitch angular velocity having been calculated, as a correction value of the pitch angular velocity. In this manner, the correction value of the pitch angular velocity calculated by the correction value calculation unit 112 is stored in the storage device 14. The correction value calculation unit 112 stores, in the storage device 14, the tilt angle α calculated by the tilt angle calculation unit 22, the tilt angle α corresponding to the correction value of the pitch angular velocity.

The corrected pitch angle calculation unit 120 corrects and calculates at least a pitch angle among the attitude angles of the vehicle on the basis of a yaw angular velocity, a pitch angular velocity, and a roll angular velocity detected by the triaxial gyro sensor 13, and the correction value of the pitch angular velocity calculated by the correction value calculation unit 112. In the present embodiment, the corrected pitch angle calculation unit 120 corrects and calculates a pitch angle. The corrected pitch angle calculation unit 120 outputs the calculated pitch angle to an external device.

The roll angle calculation unit 130 calculates a roll angle. The roll angle calculation unit 130 outputs the calculated roll angle to an external device.

The yaw angle calculation unit 140 calculates a yaw angle. The yaw angle calculation unit 140 outputs the calculated yaw angle to an external device.

Figure 4:
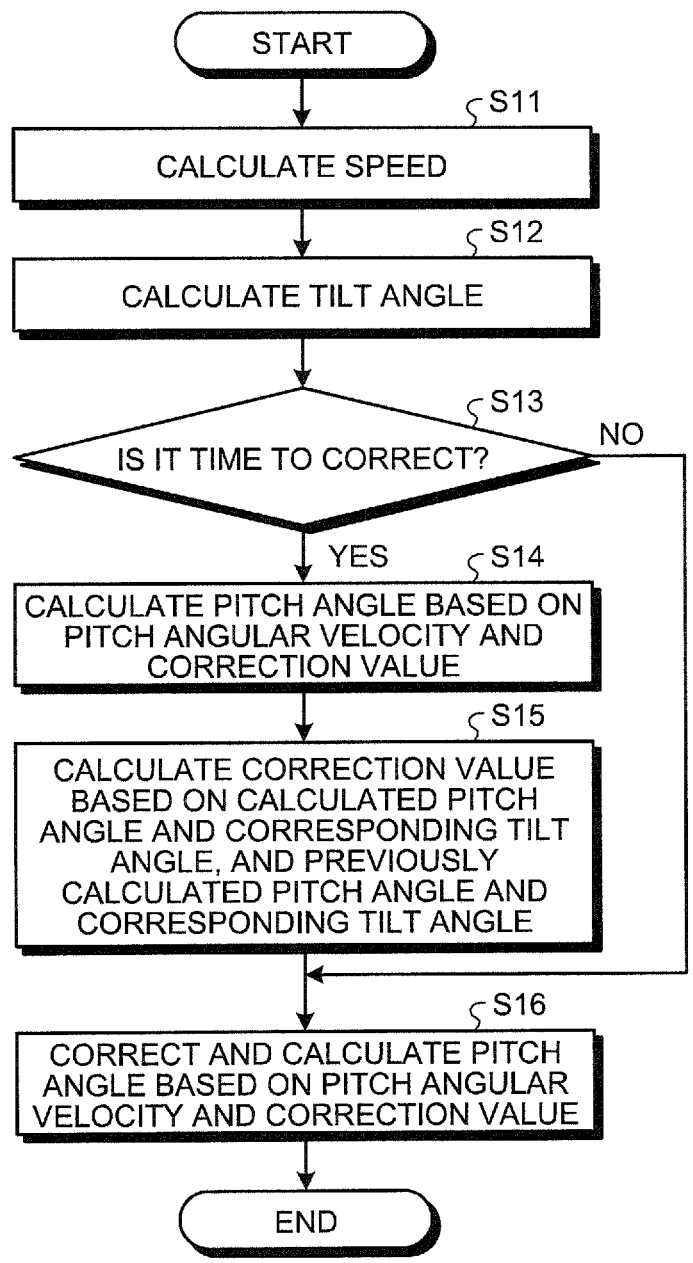
FIG. 4 illustrates a flowchart describing an exemplary flow of attitude angle calculation processing including pitch angular velocity correction value calculation processing.

Next, the following descries a flow of attitude angle calculation processing including pitch angular velocity correction value calculation processing with reference to FIG. 4. FIG. 4 illustrates a flowchart describing an exemplary flow of attitude angle calculation processing including pitch angular velocity correction value calculation processing.

The control device 20 calculates a speed of the vehicle when a speed pulse signal is input from the vehicle speed sensor 11 (step S11). Specifically, the control device 20 causes the speed calculation unit 21 to calculate a speed of the vehicle on the basis of a speed pulse signal detected by the vehicle speed sensor 11, and outputs the calculated speed to the tilt angle calculation unit 22.

The control device 20 causes the tilt angle calculation unit 22 to calculate a tilt angle of the vehicle (step S12). Specifically, the control device 20 causes the tilt angle calculation unit 22 to calculate a tilt angle of the vehicle on the basis of the speed calculated by the speed calculation unit 21 and the acceleration detected by the triaxial acceleration sensor 12.

The control device 20 determines whether it is a time to correct the correction value of the pitch angular velocity (step S13). Specifically, when the vehicle is starting or when a certain period of time has elapsed from the last calculation of the correction value of the pitch angular velocity by the correction value calculation unit 112, for example, the control device 20 determines that it is a time to correct the correction value of the pitch angular velocity (Yes at step S13) and the process proceeds to step S14. When the vehicle is not starting (the vehicle is in continuous traveling) or when a certain period of time has not elapsed from the last calculation of the correction value of the pitch angular velocity by the correction value calculation unit 112, for example, the control device 20 determines that it is not a time to correct the correction value of the pitch angular velocity (No at step S13) and the process proceeds to step S16.

The control device 20 calculates a pitch angle on the basis of the pitch angular velocity and the correction value of the pitch angular velocity (step S14). Specifically, the control device 20 causes the pitch angle calculation unit 111 to calculate a pitch angle of the vehicle on the basis of a yaw angular velocity, a pitch angular velocity, and a roll angular velocity detected by the triaxial gyro sensor 13, and the correction value of the pitch angular velocity calculated by the correction value calculation unit 112.

The control device 20 calculates the correction value of the pitch angular velocity on the basis of the calculated pitch angle and the corresponding tilt angle, and the previously calculated pitch angle and the corresponding tilt angle (step S15). Specifically, with respect to the difference between the pitch angle calculated by the pitch angle calculation unit 111 and the corresponding tilt angle α calculated by the tilt angle calculation unit 22, the control device 20 causes the correction value calculation unit 112 to compare the current difference value with a past difference value and to modify the correction value of the pitch angular velocity on the basis of the amount of difference resulting from the comparison. Specifically, with respect to the difference between the pitch angle calculated by the pitch angle calculation unit 111 and the corresponding tilt angle α calculated by the tilt angle calculation unit 22, the control device 20 modifies the correction value of the pitch angular velocity so that the amount of difference between the current difference value and the past difference value is zero. The control device 20 outputs, to the corrected pitch angle calculation unit 120, the modified correction value of the pitch angular velocity having been calculated, as a correction value of the pitch angular velocity. The control device 20 stores the modified correction value of the pitch angular velocity in the storage device 14. The control device 20 stores, in the storage device 14, the tilt angle calculated by the tilt angle calculation unit 22, the tilt angle corresponding to the modified correction value of the pitch angular velocity.

The control device 20 corrects and calculates a pitch angle on the basis of the pitch angular velocity and the correction value of the pitch angular velocity (step S16). Specifically, the control device 20 causes the corrected pitch angle calculation unit 120 to calculate a pitch angle of the vehicle on the basis of a yaw angular velocity, a pitch angular velocity, and a roll angular velocity detected by the triaxial gyro sensor 13, and the correction value of the pitch angular velocity calculated by the correction value calculation unit 112. In the present embodiment, at a step before or after step S16 (not illustrated in FIG. 4), or at step S16, the control device 20 may cause the roll angle calculation unit 130 to calculate a roll angle, and the yaw angle calculation unit 140 to calculate a yaw angle.

In this manner, when it is a time to correct the correction value of the pitch angular velocity, with respect to the difference between the pitch angle calculated by the pitch angle calculation unit 111 and the corresponding tilt angle α calculated by the tilt angle calculation unit 22, the attitude angle calculation device 100 compares the current difference value with a past difference value, and calculates the correction value of the pitch angular velocity on the basis of the amount of difference resulting from the comparison. The attitude angle calculation device 100 corrects and calculates at least a pitch angle among the attitude angles of the vehicle on the basis of a yaw angular velocity, a pitch angular velocity, and a roll angular velocity detected by the triaxial gyro sensor 13, and the correction value of the pitch angular velocity calculated by the correction value calculation unit 112.

As described above, when it is a time to correct the correction value of the pitch angular velocity, with respect to the difference between the pitch angle calculated by the pitch angle calculation unit 111 and the corresponding tilt angle α calculated by the tilt angle calculation unit 22, the attitude angle calculation device 100 can compare the current difference value with a past difference value, and calculate the correction value of the pitch angular velocity on the basis of the amount of difference resulting from the comparison. In this manner, the attitude angle calculation device 100 can accurately perform offset correction on the pitch rate gyro of the triaxial gyro sensor 13 when, for example, the vehicle travels on a slope. In other words, the attitude angle calculation device 100 can improve the accuracy of the offset correction on the pitch rate gyro of the triaxial gyro sensor 13.

The attitude angle calculation device 100 can correct and calculate at least a pitch angle among the attitude angles of the vehicle on the basis of a yaw angular velocity, a pitch angular velocity, and a roll angular velocity detected by the triaxial gyro sensor 13, and the correction value of the pitch angular velocity calculated by the correction value calculation unit 112. In this manner, the attitude angle calculation device 100 can accurately calculate an attitude angle. For example, the attitude angle calculation device 100 can accurately calculate an attitude angle of the vehicle traveling on a slope.

The attitude angle calculation device 100 including the pitch angular velocity correction value calculation unit 110 according to the present embodiment has been described; however, the device may be implemented in various forms other than the embodiment described above.

The components of the pitch angular velocity correction value calculation unit 110 and the attitude angle calculation device 100 illustrated in the drawings are conceptual in functions, and do not need to be configured physically as illustrated in the drawings. That is, specific forms of the devices are not limited to the forms illustrated in the drawings. All or a part of the devices may be distributed or integrated functionally or physically in any unit depending on the processing load and the use condition of the devices. For example, the processes performed by the pitch angle calculation unit 111 and the correction value calculation unit 112 in the pitch angular velocity correction value calculation unit 110 may be performed as a series of processes by one processing unit.

The configurations of the pitch angular velocity correction value calculation unit 110 and the attitude angle calculation device 100 are implemented, for example, as a function of the control device 20. The configurations of the pitch angular velocity correction value calculation unit 110 and the attitude angle calculation device 100 are implemented, for example, as software by a computer program or the like loaded to a memory in the same manner as the other functions of the control device 20. In the embodiment described above, description has been made on functional blocks that can be implemented by cooperation of the hardware or the software. That is, the functional blocks can be implemented in various forms by hardware alone, software alone, or a combination of hardware and software.

The pitch angle calculation unit 111 and the corrected pitch angle calculation unit 120 have been described as separate processing units; however, for example, the pitch angle calculation unit 111 and the corrected pitch angle calculation unit 120 may be implemented as one processing unit. This is because the pitch angle calculation unit 111 and the corrected pitch angle calculation unit 120 both correct and calculate at least a pitch angle among the attitude angles of the vehicle on the basis of a yaw angular velocity, a pitch angular velocity, and a roll angular velocity detected by the triaxial gyro sensor 13, and the correction value of the pitch angular velocity. The processes of both units are common.

The present invention exerts an effect of improving the accuracy of offset correction on a pitch rate gyro.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A pitch angular velocity correction value calculation device comprising:
    a speed sensor that detects a speed of an object;
    a triaxial acceleration sensor that detects an acceleration of the object;
    a triaxial gyro sensor that detects at least a pitch angular velocity of the object;
    a storage device that stores computer executable instructions and an offset correction value of the pitch angular velocity; and
    a processor that executes the computer executable instructions to perform operations, comprising:
    calculating a tilt angle α of the object based on the detected speed and the detected acceleration with an equation $$\alpha = \sin^{-1}\frac{|GA|}{|G|} = \sin^{-1}\frac{|A2|-|A1|}{|G|} \qquad (1)$$

wherein G is gravitational acceleration, A1 is a differential value of the speed in a direction of an inclined road surface R detected by the speed sensor and A2 is the acceleration in the direction of the inclined road surface R detected by the triaxial acceleration sensor;
    storing the calculated tilt angle of the object in the storage device;
    determining a pitch angle θ of the object based on the pitch angular velocity and the offset correction value of the pitch angular velocity with an equation $$q_1 = n_1 \sin \theta/2$$

$$q_2 = n_2 \sin \theta/2$$

$$q_3 = n_3 \sin \theta/2$$

$$q_4 = \cos \theta/2$$

$$q_1^2 + q_2^2 + q_3^2 + q_4^2 = |q^2| + q_4^2 = 1 \qquad (3)$$

$$\omega_1 = 2(\dot{q}_1 q_4 + \dot{q}_2 q_3 - \dot{q}_3 q_2 - \dot{q}_4 q_1)$$

$$\omega_2 = 2(\dot{q}_2 q_4 + \dot{q}_3 q_1 - \dot{q}_1 q_3 - \dot{q}_4 q_2)$$

$$\omega_3 = 2(\dot{q}_3 q_4 + \dot{q}_1 q_3 - \dot{q}_2 q_1 - \dot{q}_4 q_3) \qquad (9)$$

$$\omega = 2\begin{bmatrix} q_4 & q_3 & -q_2 & -q_1 \\ -q_3 & q_4 & q_1 & -q_2 \\ q_2 & -q_1 & q_4 & -q_3 \end{bmatrix}\begin{bmatrix} \dot{q}_1 \\ \dot{q}_2 \\ \dot{q}_3 \\ \dot{q}_4 \end{bmatrix} \qquad (10)$$

$$\overset{\circ}{q} = \frac{1}{2}(q_4 \omega + q \times \omega) \qquad (12)$$

$$\dot{q}_4 = -\frac{1}{2}\omega q$$

$$\frac{d}{dt}\begin{bmatrix} q_1 \\ q_2 \\ q_3 \\ q_4 \end{bmatrix} = \frac{1}{2}\begin{bmatrix} 0 & \omega_3 & -\omega_2 & \omega_1 \\ -\omega_3 & 0 & \omega_1 & \omega_2 \\ \omega_2 & -\omega_1 & 0 & \omega_3 \\ -\omega_1 & -\omega_2 & -\omega_3 & 0 \end{bmatrix}\begin{bmatrix} q_1 \\ q_2 \\ q_3 \\ q_4 \end{bmatrix}$$

wherein q1, q2, q3, and q4 are quaternions, $n_1$, $n_2$, and $n_3$ are unit vectors, ω is an pitch angular velocity, and q̇ is a time differential of q in an object coordinate system;
    modifying the offset correction value of the pitch angular velocity ω based on the current pitch angle θ calculated using the current correction value of the pitch angular velocity, the current tilt angle α calculated, the previous pitch angle θ calculated in the past and stored in the storage device using the current correction value of the pitch angular velocity, and the previous tilt angle α calculated at a time of calculating the previous correction value of the pitch angular velocity ω such that with respect to a difference between the calculated pitch angle θ and the calculated corresponding tilt angle α, a correction value of the pitch angular velocity ω is modified so that an amount of a difference value between the current difference and the past difference becomes zero; and
    correcting the pitch angle based on the detected pitch angular velocity and the modified offset correction value of the pitch angular velocity and to output the corrected pitch angle.

* * * * *